US012713181B2

(12) United States Patent
Thomas et al.

(10) Patent No.: US 12,713,181 B2
(45) Date of Patent: Aug. 18, 2026

(54) SYSTEMS, METHODS, AND DEVICES FOR AUTOMOBILE ENVIRONMENT MONITORING AND SIGNAL STEERING

(71) Applicant: Cypress Semiconductor Corporation, San Jose, CA (US)

(72) Inventors: Michael Thomas, San Jose, CA (US); Raffaele Soloperto, Olching (DE); Manuela Alba Bueno, Unterhaching (DE)

(73) Assignee: Infineon Technologies Americas Corp., El Segundo, CA (US)

( * ) Notice: Subject to any disclaimer, the term of this patent is extended or adjusted under 35 U.S.C. 154(b) by 226 days.

(21) Appl. No.: 18/585,586

(22) Filed: Feb. 23, 2024

(65) Prior Publication Data

US 2025/0274703 A1 Aug. 28, 2025

(51) Int. Cl.
*H04R 1/40* (2006.01)

(52) U.S. Cl.
CPC ............. *H04R 1/403* (2013.01); *H04R 1/406* (2013.01); *H04R 2430/20* (2013.01); *H04R 2499/13* (2013.01)

(58) Field of Classification Search
CPC .... H04R 1/403; H04R 1/406; H04R 2430/20; H04R 2499/13
See application file for complete search history.

(56) References Cited

U.S. PATENT DOCUMENTS 5,233,664 A * 8/1993 Yanagawa ................ H04R 3/12 381/89
7,343,020 B2 * 3/2008 Thigpen ................... H04R 5/02 381/302
9,854,363 B2 * 12/2017 Sladeczek ................. H04S 3/00
11,354,087 B2 * 6/2022 Noguchi ................ H04R 1/403
2005/0259831 A1 * 11/2005 Hutt ......................... H04R 5/02 381/86
2017/0323639 A1 * 11/2017 Tzirkel-Hancock ......................... B60H 1/00757
2023/0224981 A1 * 7/2023 Kim ....................... H04R 1/403

* cited by examiner

*Primary Examiner* — Jason R Kurr

(57) ABSTRACT

Systems, methods, and devices provide monitoring of entities in automobile environments. Methods include determining, using a processing device, a first plurality of phase modulation parameters for a speaker array based on a relationship between speakers included in the speaker array and a designated target location. Methods further include generating, using the processing device, a plurality of audio signals for the speakers included in the speaker array, each of the plurality of audio signals including a phase adjustment determined based on the first plurality of phase modulation parameters, and transmitting the plurality of audio signals via the speaker array to the designated target location.

20 Claims, 11 Drawing Sheets

200

SYSTEMS, METHODS, AND DEVICES FOR AUTOMOBILE ENVIRONMENT MONITORING AND SIGNAL STEERING

TECHNICAL FIELD

This disclosure relates to automobile environments, and more specifically, to enhancement of monitoring of entities and signal steering in such automobile environments.

BACKGROUND

Infotainment systems and wireless devices may be implemented in a variety of contexts, such as automobiles and other vehicles. Such systems and devices may be configured to support wireless communications in accordance with wireless communication protocols. Moreover, they may also include various other sensing modalities to obtain information about an operational environment, such as whether or not a person is present within the operational environment. However, conventional techniques for transmitting and receiving audio signals as well as performing radar detections remain limited because they are not able to efficiently perform such operations in various operational conditions such as, for example, ambient noise is high.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Embodiments disclosed herein provide signal steering for signals transmitted and received within an operational environment, such as the interior of an automobile. As will be discussed in greater detail below, arrays of speakers and microphones may be configured to provide beam forming and signal steering for audio signals used for transmitting audio and receiving audio within the operational environment. As will also be discussed in greater detail below, such improved techniques for delivery and reception of audio signals may also be leveraged to improve performance of radar capabilities of components included within the operational environment. For example, such arrays of speakers and microphones may be used to support radar operations used for in-cabin monitoring and seat-occupancy-detection.

Figure 1:
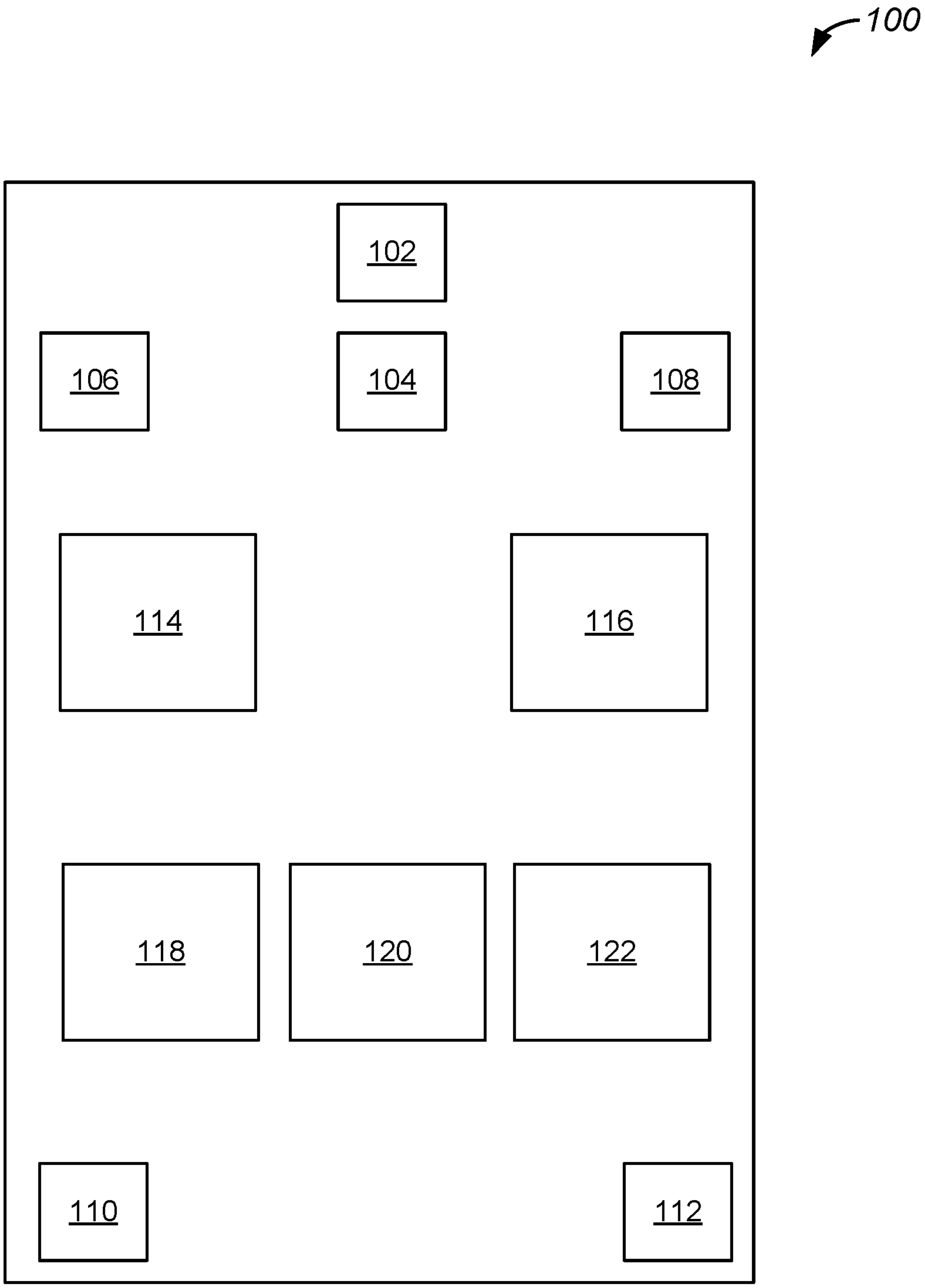
FIG. 1 illustrates diagram of a system for automobile environment monitoring and signal steering, configured in accordance with some embodiments.

FIG. 1 illustrates diagram of a system for automobile environment monitoring and signal steering, configured in accordance with some embodiments. As similarly discussed above, an automobile environment, such as automobile environment 100, may include various components configured to monitor a status of one or more locations within automobile environment 100. As will be discussed in greater detail below, automobile environment 100 includes components configured to utilize such status information to enhance transmission to and reception from such locations. Moreover, such directional signal steering allows automobile environment 100 to make presence determinations about specific locations within automobile environment 100 and target delivery of an audio signal to such specific locations as well as receive an audio signal from such specific locations.

In various embodiments, automobile environment 100 is a vehicle, such as an automobile, that includes multiple seating locations, such as seat location 114, seat location 116, seat location 118, seat location 120, and seat location 122. Automobile environment 100 additionally includes components configured to monitor the different seat locations, and determine whether or not an entity, such as a user, is present at the seat locations. In various embodiments, the monitoring may be performed via one or more radar operations in which sound is transmitted and received, and a presence of an entity is determined based on a reflected signal.

Accordingly, automobile environment 100 includes radar module 104 which is configured to transmit and receive a signal that may be generated based on a reflection of the transmitted signal. In various embodiments, radar module 104 includes a transducer, such as a microphone, as well as associated processing hardware, such as an amplifier, configured to receive and amplify the received signal. For example, radar module 104 may be configured to receive a signal at 60 GHz, and generate an output based on such a received signal. In some embodiments, radar module 104 is included in an in-cabin monitoring system provide by Infineon®. In some embodiments, radar module 104 additionally includes one or more processors and a memory that may be configured to perform radar detection operations. Accordingly, radar module 104 may be configured to determine if an entity is present based on one or more temporal, frequency, and/or phase computations performed in accordance with any suitable radar computation. For example, radar module 104 may be a Doppler radar that transmits periodic pulses, and performs ranging computations based on a reflected signal. More specifically, a temporal offset value determined based on the timing of the reception of the reflect signal may be compared against a threshold value to determine if an entity is present at a designated location. Moreover, radar module 104 may be configured to generate an output representing a result of such a determination.

In various embodiments, radar module 104 is configured to use a Frequency Modulated Continuous Wave (FMCW) transmitted over a range (R) to one or more targets within a Field of View (FoV) can be calculated using equation 1 shown below:

$$R = \frac{T_C \times \Delta f \times C}{2 \times BW} \quad (1)$$

In equation 1, $T_C$ is a chirp period of the radar signal, Δf is the receive beat frequency, C is the speed of light, and BW is the occupied bandwidth of the radar signal. In various embodiments, such parameters may be determined by an entity, such as a manufacturer in accordance with operational parameters determined during a design process. In some embodiments, to determine angular offsets of radar targets within the FoV, the transceiver may use two or more receiver antennas. In some embodiments, virtual receiver antennas ($n_{RX}$) may be determined based on the number of Tx antennas multiplied by the number of receiver antennas. In some embodiments, the angular resolution (ΔA) is improved with a larger number of $n_{RX}$, as shown in equation 2 below, where λ=the wavelength of the radar signal:

$$\Delta A = \frac{\lambda}{d \times n_{RX} \cos_\theta} \times \frac{180}{\pi} \quad (2)$$

Thus, according to some embodiments, to detect occupants within the cabin of a vehicle, FMCW modulation is used, and a transceiver included in radar module 104 may use two transmit channels and four receiver channels, or eight virtual receiver antennas. Therefore, when the transceiver is operating at 60 GHz the ΔA is then 14.3 degrees. In various embodiments, such operational parameters are capable of detecting the position of five adults within the cabin of a five-seater vehicle with an accuracy of 90% or better.

Automobile environment 100 additionally includes processing device 102 which includes one or more processors and a memory that may be configured to perform processing operations for automobile environment 100, such as management and streaming of data. In various embodiments, processing device 102 is a head unit, as may be included in an infotainment system of an automobile. Accordingly, processing device 102 may include additional hardware and software for wireless communication, such as one or more wireless transceivers and associated processing logic. Moreover processing device 102 may be configured to generate an audio signal that is sent to speaker 106, speaker 108, speaker 110, and speaker 112. In some embodiments, processing device 102 is configured to execute an application used to stream audio data, and such audio data may be converted to an audio signal provided to the speakers. Moreover, processing device 102 may also be configured to generate a signal sent via the speakers during a radar detection mode that is used to augment radar detection operations of radar module 104.

Automobile environment 100 one or more speakers, such as speaker 106, speaker 108, speaker 110, and speaker 112. As will be discussed in greater detail below, each speaker may be a speaker array configured to generate an audio signal targeted at a seat location in a configurable manner. For example, each speaker may perform one or more beam forming operations to guide an audio signal to the targeted location. As will be discussed in greater detail below with reference to FIG. 2 and FIG. 3, speaker 106, speaker 108, speaker 110, and speaker 112 may collectively target a single seat location such that a received signal and/or radar determination is made specific to that seat location.

In various embodiments, the beam forming and targeting may be configured to cycle through target seat locations in a designated order. Moreover, such an order may be configurable by an entity, such as a manufacturer or a user/occupant of the vehicle. For example, a user may specify a priority list of seat locations that is used to determine an order in which target seat locations are scanned. In one example, if an occupant of automobile environment 100 is expecting a phone call, the occupant may identify himself or herself as having the highest priority in beam forming operations. Such a higher priority may correspond to increased priority in a scanning order, as well as increased time spent targeting that seat location. Such a priority determination may also selectively omit other seat locations. In the example of an expected phone call, rear seat locations may be omitted as they may be occupied by children.

Moreover, such configuration of beam forming operations in the context of seat locations may be configured dynamically and based on events within automobile environment 100. For example, reception of a phone call, as may be detected by processing device 102, may trigger implementation of a designated priority list, such as omission of rear occupants and a highest priority for the driver. Similarly, types data values and audio streams detected by processing device 102 may also be used to implement different priority lists. For example, if a movie or particular type of audio file is detected as being played at processing device 102, the rear occupants may be given highest priority and the front driver and passenger may be omitted. In this way, beam forming and targeting of audio signals may be configured based on designated parameters set by a user or manufacturer, or configured dynamically based on events within automobile environment 100.

Figure 2:
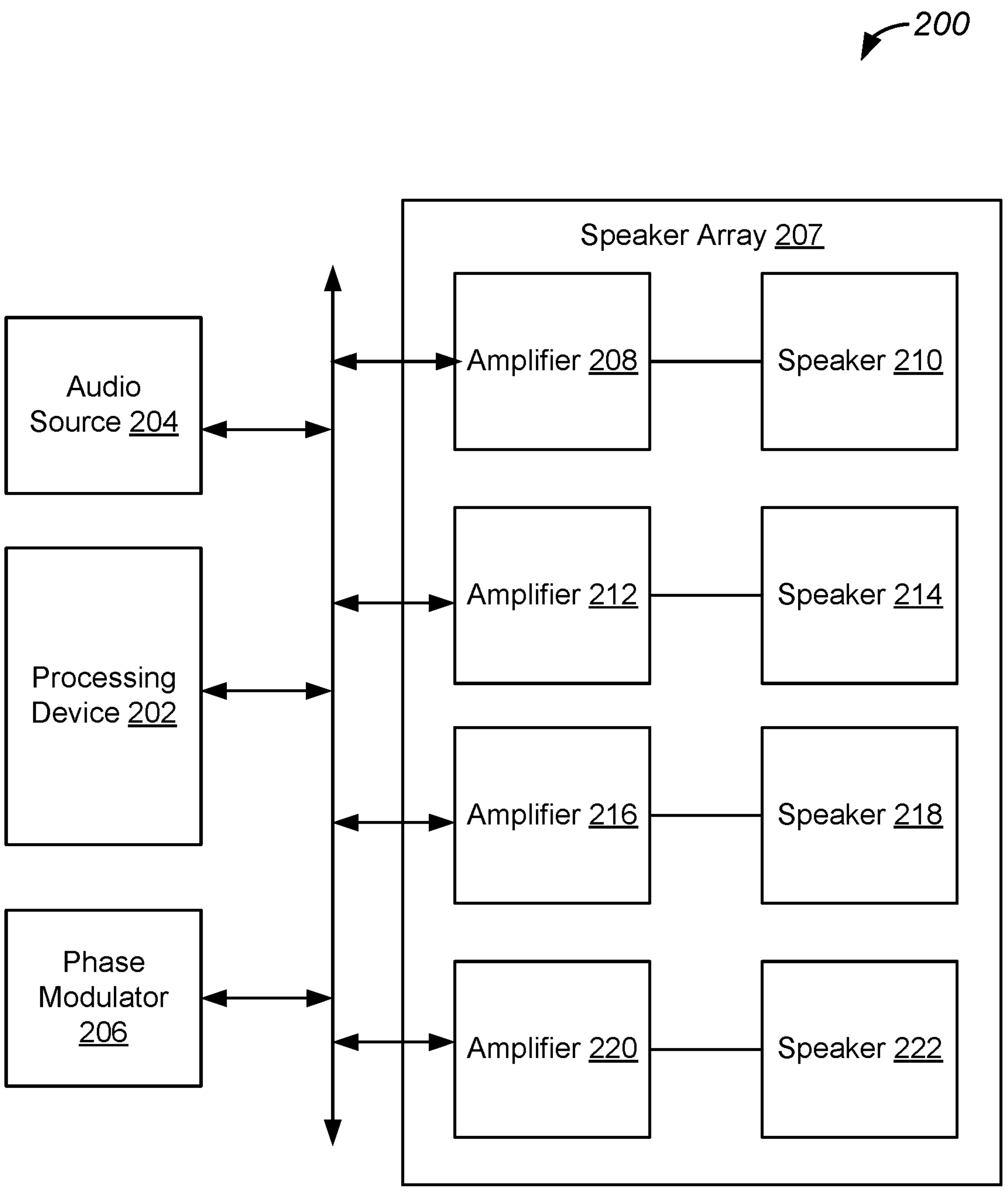
FIG. 2 illustrates diagram of a device for automobile environment monitoring and signal steering, configured in accordance with some embodiments.

FIG. 2 illustrates diagram of a system for automobile environment monitoring and signal steering, configured in accordance with some embodiments. As similarly discussed above, speakers used for audio signal transmission and radar detection operations may be configured to generate directional audio signals configured to target specific locations. As will be discussed in greater detail below, such speakers may include speaker arrays that are configured to generate directional audio signals used to target locations, and such targeting may be determined based on one or more radar determinations.

Thus, according to some embodiments, automobile environment 200 includes processing device 202. As similarly discussed above, processing device 202 may be included in a head unit of an automobile and may include one or more processors configured to make presence determinations identifying the presence or absence of an entity at a target location. In various embodiments, automobile environment 200 additionally includes audio source 204 which may be configured to generate an audio signal transmitted by one or more speakers. As similarly discussed above, audio data may be generated by an application executed on a device, such as audio source 204, and such audio data may be transmitted via speaker array 207. In some embodiments, audio source 204 may also include a signal generator and associated processing logic configured to generate an audio signal used for radar detection operations. The audio signal may be an arbitrary waveform, or a waveform generated in accordance with a radar standard and configured based on capabilities of the speakers. It will be appreciated that audio source 204 may be included within processing device 202 or implemented separately.

Automobile environment 200 additionally includes phase modulator 206 which is configured to generate phase modulation parameters used to implement directional targeting of an audio output of a speaker array, such as speaker array 207. As will be discussed in greater detail below, such phase modulation parameters may be phase offset values computed for each speaker.

In various embodiments, speaker locations and seat locations remain fixed and relatively constant within a vehicle other than relatively small lateral movements associated with the front driver and passenger seats due to vehicle motion. Accordingly, an angle from any speaker to any seat location is known based on the geometry of the vehicles cabin design. As similarly discussed above, radar techniques can determine if a given seat location is occupied by a person, and the location of the occupied seat can then be sent from a component, such as a radar module, to speaker locations. As will be discussed in greater detail below, each speaker may have a look-up-table that may be stored in memory or in an EEPROM of an associated microcontroller unit (MCU) that may be included in processing device 202. In various embodiments, the angle from the speaker to the occupied seat location can then be determined based on the data values stored in the look-up-table. In some embodiments, the phase shift (@) for each speaker is then calculated using equation 3 shown below. In equation 3, d is the distance between each speaker in the speaker array, AoA is the angle of arrival for the audio signal to the target, and λ is wavelength of the audio signal.

$$\omega = \frac{2 \times \pi \times d \times \sin AoA\left(\frac{\pi}{180}\right)}{\lambda} \quad (3)$$

More specifically, speaker array 207 may include multiple different speakers configured to generate an audio output based on a received input signal. For example, speaker array 207 may include speaker 210, speaker 214, speaker 218, speaker 222, which may each have an associated amplifier, such as amplifier 208, amplifier 212, amplifier 216, and amplifier 220. As will be discussed in greater detail below, the phase modulation parameters may configure a directionality of an output of speaker array 207. In this way, such phase modulation parameters may be modified to target different locations within automobile environment 200.

Figure 3:
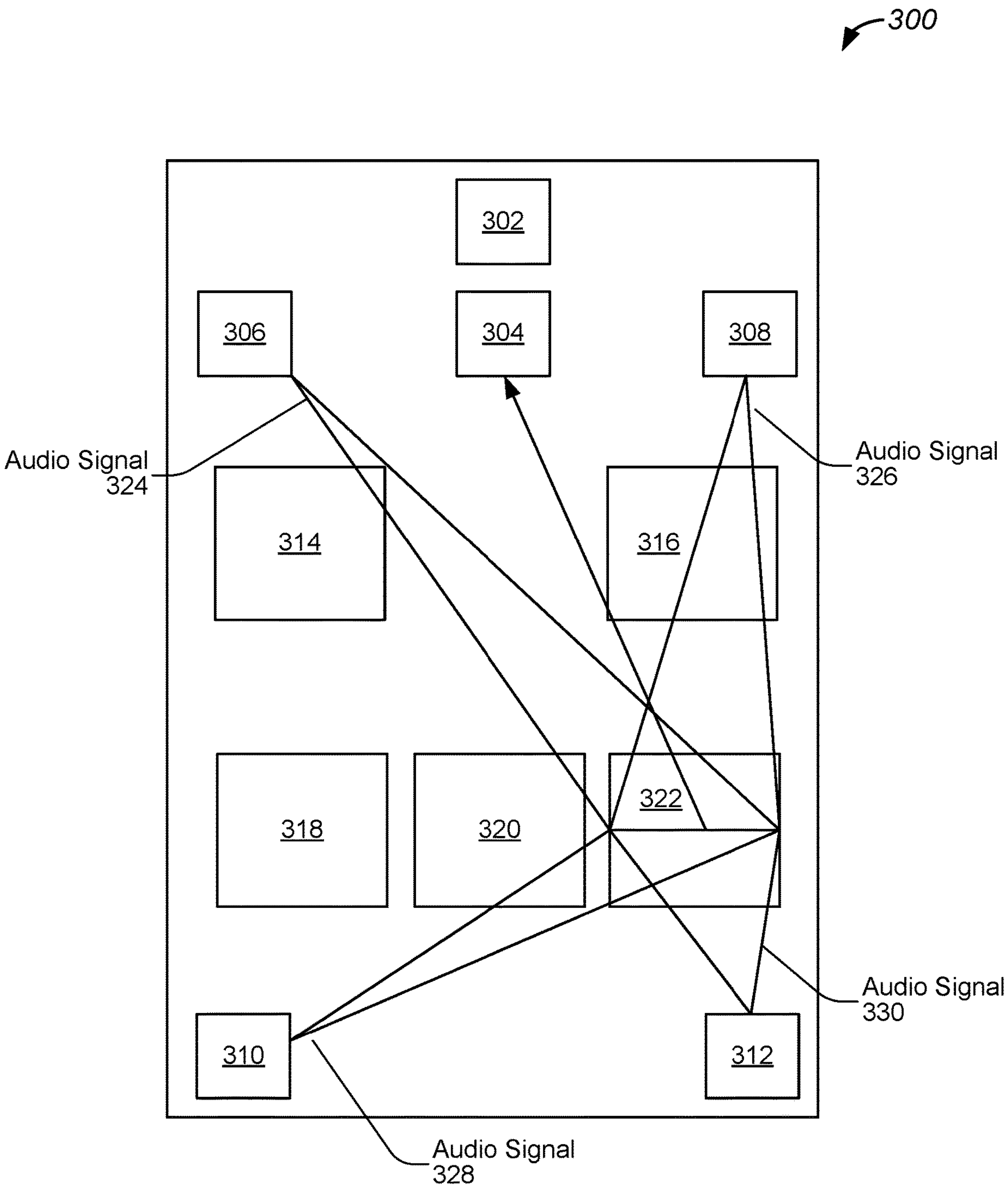
FIG. 3 illustrates diagram of another system for automobile environment monitoring and signal steering, configured in accordance with some embodiments.

FIG. 3 illustrates diagram of another system for automobile environment monitoring and signal steering, configured in accordance with some embodiments. As similarly discussed above, automobile environment 300 may include radar module 304 and processing device 302. Automobile environment 300 may also include seat location 314, seat location 316, seat location 318, seat location 320, and seat location 322. Automobile environment 300 may further include various speakers, such as speaker 306, speaker 308, speaker 310, and speaker 312. As also discussed above, each speaker may be a speaker array configured to directionally transmit an audio signal based, at least in part, on phase modulation parameters.

As shown in FIG. 3, audio signals from the speakers may be collectively targeted at a particular location. In this example, speaker 306, speaker 308, speaker 310, and speaker 312 are all targeted at seat location 322. In one example, radar module 304 may have performed one or more radar operations and determined an entity is present at seat location 322. Radar module 304 may have provided this determination to processing device 302, and processing device 302 may have determined phase modulation parameters for each of the speakers based on this determination. Processing device 302 may then configure a phase modulator for each speaker, which may be each be a speaker array. Processing device 302 may also provide an audio signal for transmission to the speakers. For example, audio signal 324 may be transmitted from speaker 306, audio signal 326 may be transmitted from speaker 308, audio signal 328 may be transmitted from speaker 310, and audio signal 330 may be transmitted from speaker 312.

In some embodiments, the speakers may participate in the radar determinations. For example, a first target location may be selected, such as seat location 322. Moreover, audio signal 324 may be transmitted from speaker 306, audio signal 326 may be transmitted from speaker 308, audio signal 328 may be transmitted from speaker 310, and audio signal 330 may be transmitted from speaker 312. A reflected signal may be received at radar module 304 and used to determine if an entity is present. In this example, during radar detection operations, the speakers may cycle among seat locations based on designated phase modulation parameters such that each seat location is measured periodically.

Figure 4:
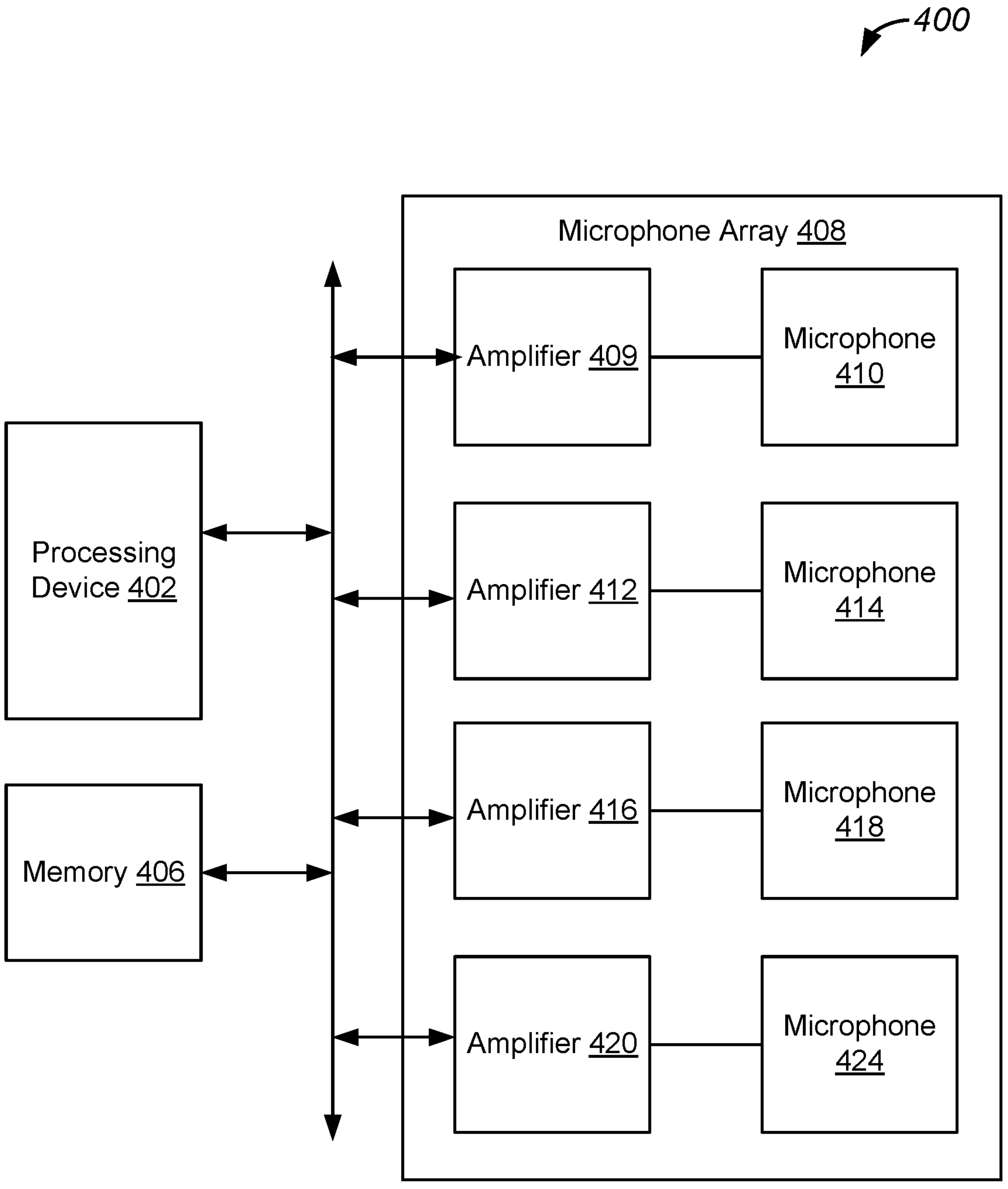
FIG. 4 illustrates diagram of an additional device for automobile environment monitoring and signal steering, configured in accordance with some embodiments.

FIG. 4 illustrates diagram of an additional device for automobile environment monitoring and signal steering, configured in accordance with some embodiments. In various embodiments, an automobile environment, such as automobile environment 400, may be configured to include a microphone array, such as microphone array 408, that is configured to receive audio signals directionally. In this way, one or more dedicator microphone arrays may be included in an automobile environment to improve reception of audio signals that may originate from, for example, a passenger seated at a particular location. In some embodiments, such directional audio signal detection may also be used for radar operations.

In various embodiments, microphone array 408 may include multiple microphones, such as microphone 410, microphone 414, microphone 418, and microphone 424 which may each have an associated amplifier, such a amplifier 409, amplifier 412, amplifier 416, and amplifier 420. Accordingly, each microphone may be configured to receive an audio signal that originates within automobile environment 400, and generate an output based on the received signal.

In various embodiments, automobile environment 400 additionally includes processing device 402 which is configured to receive audio signals from microphone array 408 and is also configured to retrieve data values from memory 406. In some embodiments, a signal generated by the radar module that is sent to the speakers may also be sent to the microphones. In some embodiments, a look-up-table is stored in memory 406, which may be an EEPROM, that determines the angle of each microphone to the location of the target detected by the radar module. As the distance between each microphone in the microphone array is known based on a geometry of the design and/or package of microphone array 408 and the vehicle, the angle of arrive (AoA) of the audio from the occupant in the known seat location is then determined. The phase (ω) is then calculated using equation 4 below, where d is the distance between each microphone, and λ is the wavelength of the audio signal.

$$\omega = \frac{2 \times \pi \times d \times \sin\theta}{\lambda} \tag{4}$$

Figure 5:
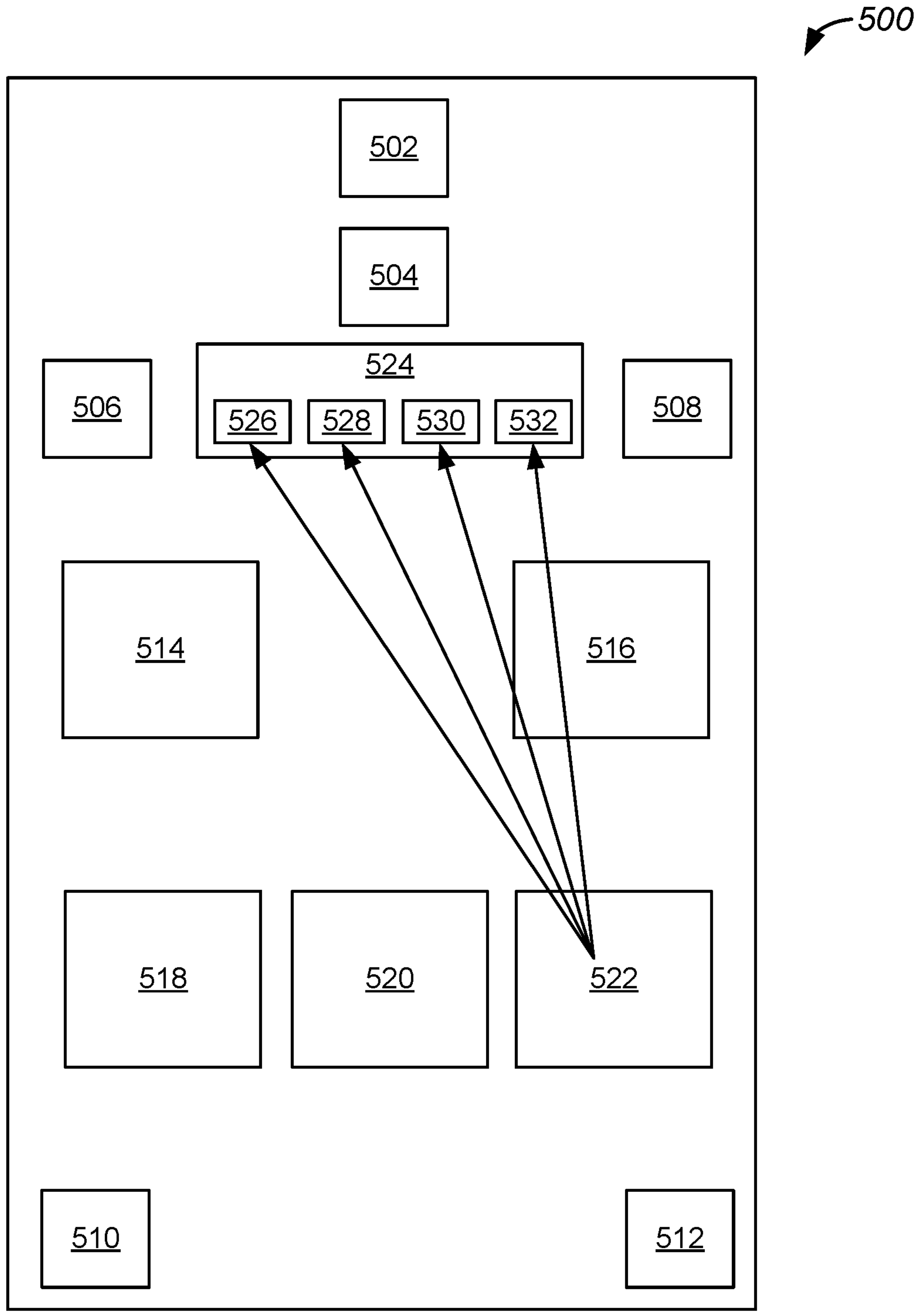
FIG. 5 illustrates diagram of another system for automobile environment monitoring and signal steering, configured in accordance with some embodiments.

FIG. 5 illustrates diagram of another system for automobile environment monitoring and signal steering, configured in accordance with some embodiments. As similarly discussed above, automobile environment 500 may include radar module 504 and processing device 502. Automobile environment 500 may also include seat location 514, seat location 516, seat location 518, seat location 520, and seat location 522. Automobile environment 500 may further include various speakers, such as speaker 506, speaker 508, speaker 510, and speaker 512.

In various embodiments, automobile environment 500 additionally includes microphone array 524. As shown in FIG. 5, microphone array 524 includes an array of microphones, such as microphone 526, microphone 528, microphone 530, and microphone 532. In various embodiments, microphone array 524 is configured to receive audio signals from a particular location within automobile environment 500, such as seat location 522. As also shown in FIG. 5, an angle of arrival and a time of arrival at each of the microphones may be different based on differences in their physical locations. Accordingly, phase modulation parameters may be used to interpret such phase and time differences to generate a received audio input from the target location. In various embodiments, the audio signal generated at seat location 522 may be an audio command generated by a user. In some embodiments, the audio signal may be a reflected signal generated during radar operations.

Figure 6:
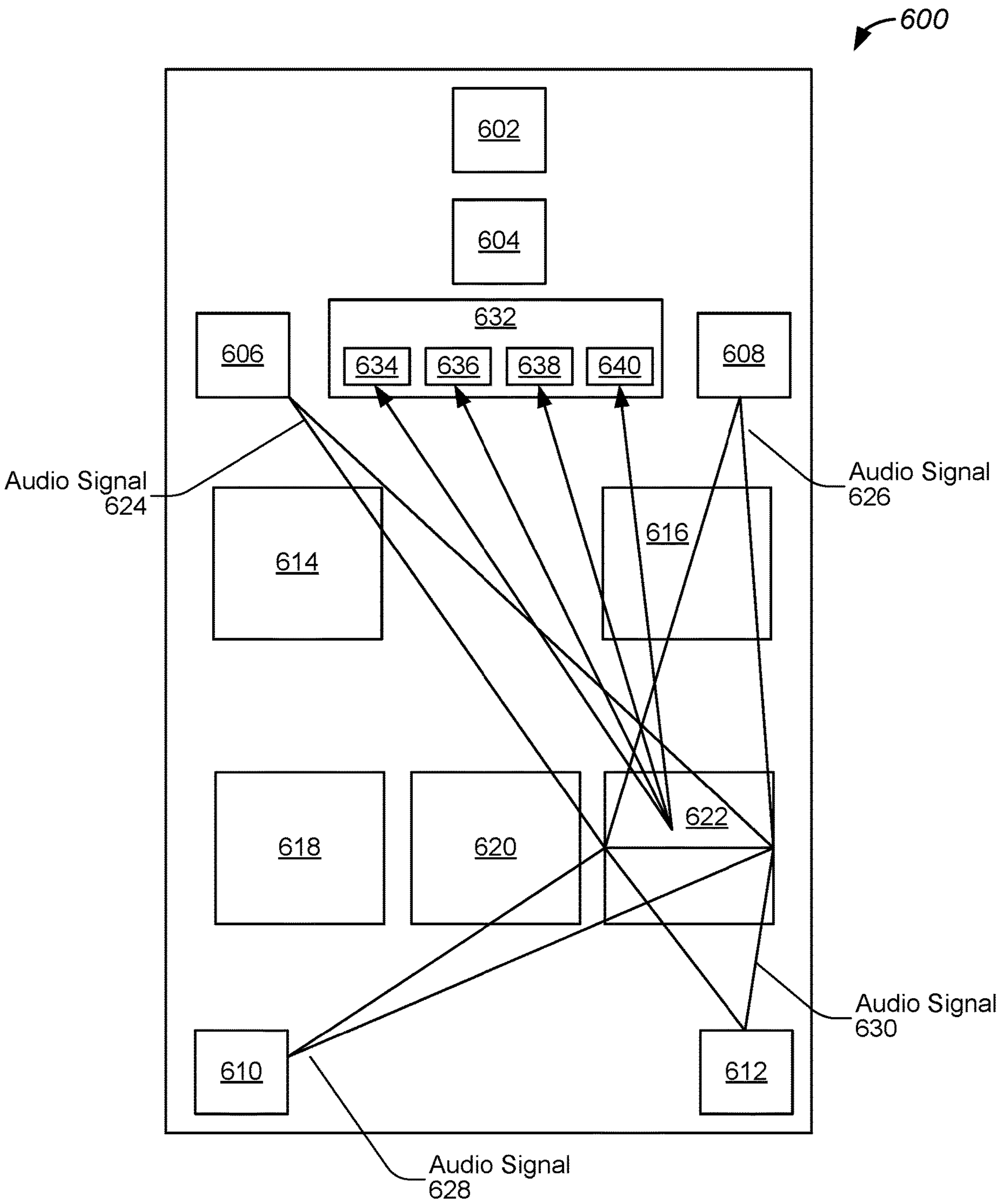
FIG. 6 illustrates diagram of an additional system for automobile environment monitoring and signal steering, configured in accordance with some embodiments.

FIG. 6 illustrates diagram of an additional system for automobile environment monitoring and signal steering, configured in accordance with some embodiments. As similarly discussed above, automobile environment 600 may include radar module 604 and processing device 602. Automobile environment 600 may also include seat location 614, seat location 616, seat location 618, seat location 620, and seat location 622. Automobile environment 600 may further include various speakers, such as speaker 606, speaker 608, speaker 610, and speaker 612. As also discussed above, each speaker may be a speaker array configured to directionally transmit an audio signal based, at least in part, on phase modulation parameters. In various embodiments, automobile environment 600 additionally includes microphone array 632. As shown in FIG. 6, microphone array 632 includes an array of microphones, such as microphone 634, microphone 636, microphone 638, and microphone 640. Thus, according to various embodiments disclosed herein, audio may be transmitted directionally within automobile environment 600, as shown by audio signal 624, audio signal 626, audio signal 628, and audio signal 630. Moreover, audio may be received directionally as well via microphone array 632. In this way, audio may be transmitted and received directionally within automobile environment 600 to improve audio delivery and reception with respect to a particular location as well as radar operations specific to a particular location. It will be appreciated that while FIG. 6 shows both the speakers and microphone array 632 targeting the same location, they may also target different locations independently.

Figure 7:
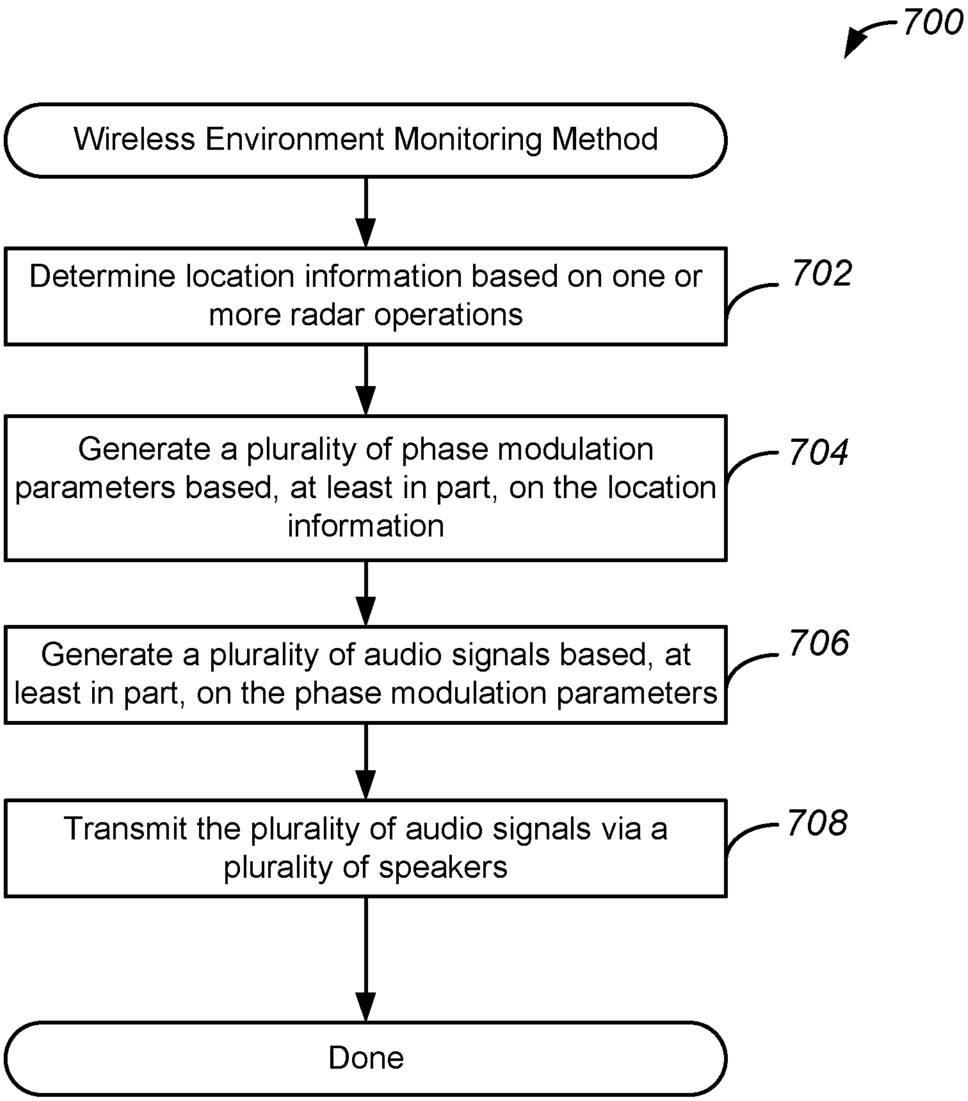
FIG. 7 illustrates diagram of a method for automobile environment monitoring and signal steering, configured in accordance with some embodiments.

FIG. 7 illustrates diagram of a method for automobile environment monitoring and signal steering, configured in accordance with some embodiments. As similarly discussed above, speakers may be configured to generate directional audio signals configured to target specific locations within an automobile environment. Accordingly, a method, such as method 700, may be performed to generate directional audio signals used to target such locations to improve the quality of audio signals received at a target location.

Method 700 may perform operation 702 during which location information may be determined based on one or more radar operations. As similarly discussed above, a radar module may be configured to perform radar operations to identify the presence of an entity within an automobile environment. Accordingly, during operation 702, radar operations may be performed, and a radar module may identify the presence of an entity at a designated location. In one example, the radar module may be configured to monitor a set of known locations, such as seating locations, and may periodically scan each of the known locations. In response to identifying the presence of an entity, the known location being scanned may be returned as location information which may be represented by a unique identifier.

Method 700 may perform operation 704 during which a plurality of phase modulation parameters may be generated based, at least in part, on the location information. Accordingly, as similarly discussed above, a look-up-table may be used to retrieve phase modulation parameters based on the location information. Thus, according to some embodiments, the look-up-table may be configured to map the location identifier to a plurality of sets of phase modulation parameters. For example, a set of phase modulation parameters may be retrieved for each speaker within the automobile environment. Such phase parameters included in the look-up-table may have been determined by an entity, such as a manufacturer, during a design and manufacturing process.

Method 700 may perform operation 706 during which a plurality of audio signals may be generated based, at least in part, on the phase modulation parameters. Accordingly, audio signals may be generated for each speaker within each speaker array. The audio signal may be audio data, such as music, and each audio signal may be phase modulated based on the phase modulation parameters.

Method 700 may perform operation 708 during which the plurality of audio signals may be transmitted via a plurality of speakers. Accordingly, the audio signals may be transmitted from the speaker arrays, and directional beam forming may be provided via the phase modulation introduced by the phase modulation parameters. In this way, delivery of the audio signal to the target location may be improved without the use of additional global adjustments, such as global volume adjustments.

Figure 8:
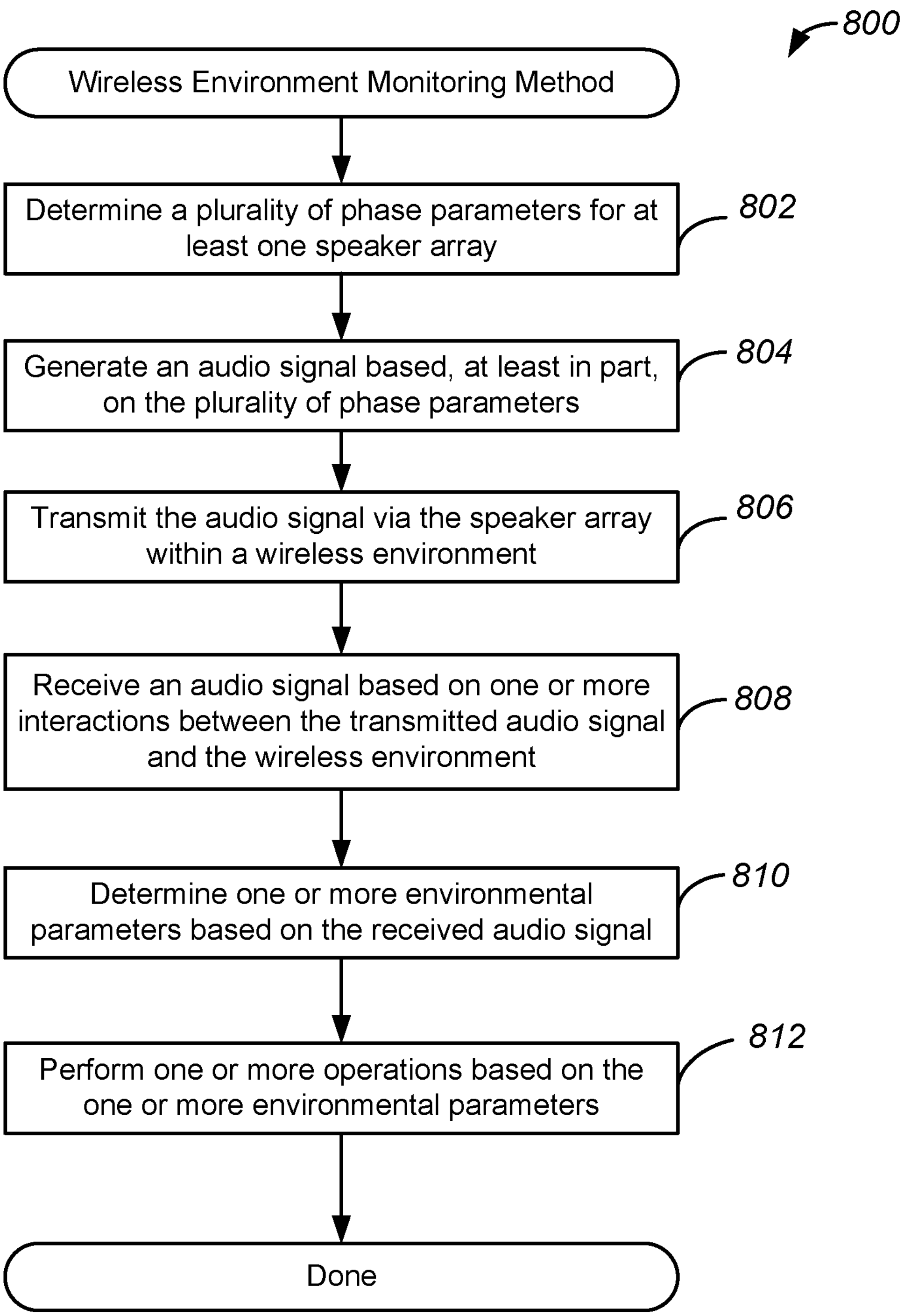
FIG. 8 illustrates diagram of another method for automobile environment monitoring and signal steering, configured in accordance with some embodiments.

FIG. 8 illustrates diagram of another method for automobile environment monitoring and signal steering, configured in accordance with some embodiments. As similarly discussed above, speakers may be configured to generate directional audio signals configured to target specific locations within an automobile environment. Moreover, a method, such as method 800, may be performed to generate directional audio signals that may be used to improve radar operations within an automobile environment.

Method 800 may perform operation 802 during which a plurality of phase parameters may be determined for at least one speaker array. As similarly discussed above, such phase parameters may be determined based on a look-up-table configured for the at least one speaker array, and the phase parameters may be determined by an entity, such as a manufacturer, during a design and manufacturing process. In various embodiments, an automobile environment may include multiple speaker arrays, such as four speaker arrays. It will be appreciated that each speaker array may have a look-up-table configured specifically for that speaker array based on its position relative to locations within the automobile environment, such as seat locations.

Accordingly, during operation 802 a location may be identified, and phase parameters may be looked up based on the initial location that was identified. As similarly discussed above, a set of designated locations may be mapped to appropriate phase parameters within the look-up-table, and the phase parameters may be identified based on the mapping. In some embodiments, the location may be identified based on an input received from the automobile environment. For example, such an input may be received from a sensor, such as a seatbelt sensor or a pressure sensor, included at a particular location, such as a seat location. In another example, the location may be identified based on a progression through a designated set of locations. For example, seat locations may be stored as a designated set of locations, and method 800 may cycle through the set of locations to periodically scan each one. Such cycling may be controlled by a state machine or any other suitable means.

Method 800 may perform operation 804 during which an audio signal may be generated based, at least in part, on the plurality of phase parameters. Accordingly, a waveform may be generated for radar operations, and may be modulated based on the phase parameters. For example, each speaker within the speaker array may have its own audio signal configured based on a phase parameter specific to that speaker. More specifically, the phase parameter may identify a phase shift or phase delay, and the audio signal for each speaker within the speaker array may be modified to implement the phase parameter for that speaker as determined based on the look-up-table.

Method 800 may perform operation 806 during which the audio signal may be transmitted via the speaker array within an automobile environment. Accordingly, the audio signal may be amplified and output via the speakers included in the speaker array. As discussed above, the phase parameters applied to the audio signals may provide beam forming and directionality of the audio output that targets a designated location that corresponds to the initially identified location mentioned above with reference to operation 802.

Method 800 may perform operation 808 during which an audio signal may be received based on one or more interactions between the transmitted audio signal and the automobile environment. Accordingly, the transmitted signal may reflect off of objects included in the automobile environment. For example, the transmitted audio signal may reflect off of an entity, such as a person, seated at the location being measured. Accordingly, the transmitted signal may reflect off of the person and be reflected back to one or more microphones included in a radar module that receives the reflected signal as a received audio signal.

Method 800 may perform operation 810 during which one or more environmental parameters may be determined based on the received audio signal. In various embodiments, the environmental parameters may be generated based on radar computations, and may identify whether or not an entity is present at the location that was scanned. More specifically, the environmental parameters may be configured to represent a positive or negative determination of a presence of an entity based on radar operations, and may be stored in memory.

Method 800 may perform operation 812 during which one or more operations may be performed based on the one or more environmental parameters. In various embodiments, the operations may be performed responsive to the detection of an entity. For example, in response to detecting an entity, such as a person, at the location being measured, a message may be generated and transmitted wirelessly to a wireless device, such as a smart phone. In this example, the person may be a child or pet, and the environmental parameters may identify child occupancy. In response to detecting the child, operations such as generation of a notification message, lowering of automobile windows, and/or unlocking of doors may be performed.

Figure 9:
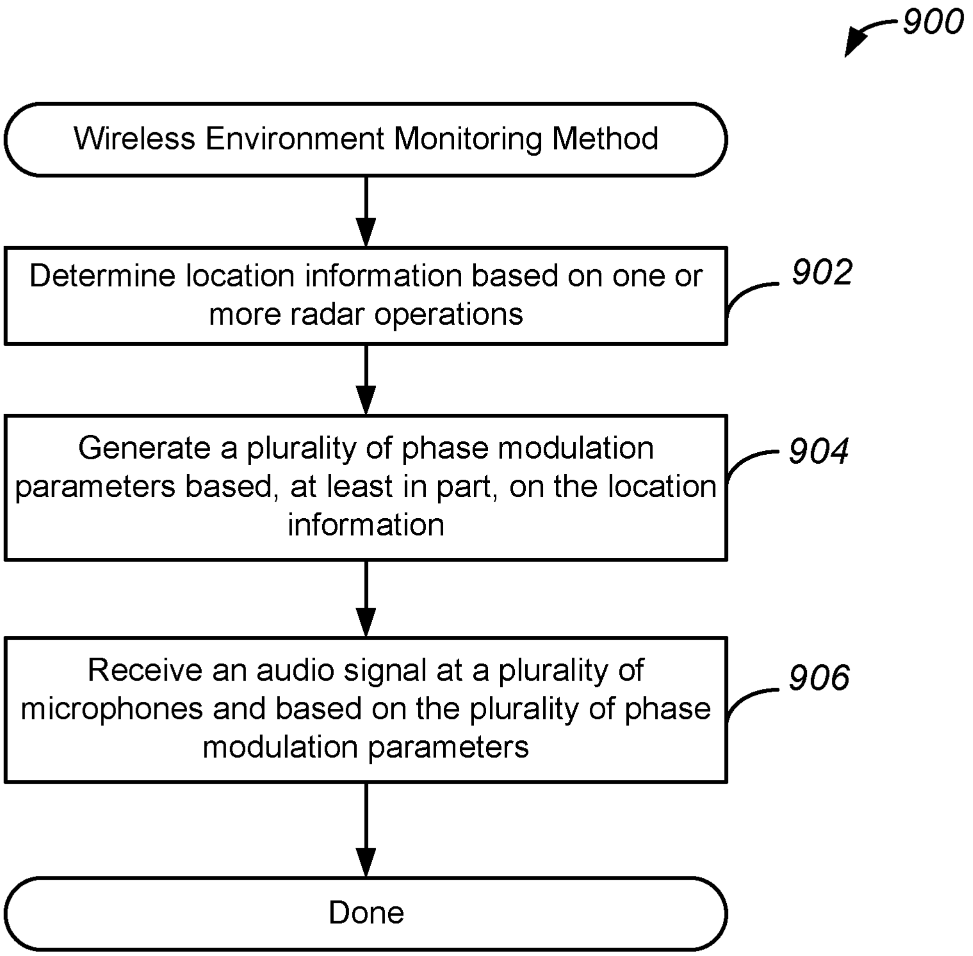
FIG. 9 illustrates diagram of an additional method for automobile environment monitoring and signal steering, configured in accordance with some embodiments.

FIG. 9 illustrates diagram of an additional method for automobile environment monitoring and signal steering, configured in accordance with some embodiments. As similarly discussed above, microphones may be configured to directionally receive audio signals generated at specific locations within an automobile environment. Accordingly, a method, such as method 900, may be performed to directionally receive audio signals from such locations to improve the quality of audio signals received from such locations and improve tolerance of ambient noise as may occur in an automobile in motion.

Method 900 may perform operation 902 during which location information may be determined based on one or more radar operations. As similarly discussed above, a radar module may be configured to perform radar operations to identify the presence of an entity within an automobile environment. Accordingly, during operation 902, radar operations may be performed, and a radar module may identify the presence of an entity at a designated location. In one example, the radar module may be configured to periodically scan each of the known locations. In response to identifying the presence of an entity, the known location being scanned may be returned as location information which may be represented by a unique identifier.

Method 900 may perform operation 904 during which a plurality of phase modulation parameters may be generated based, at least in part, on the location information. Accordingly, as similarly discussed above, a look-up-table may be used to retrieve phase modulation parameters based on the location information. Thus, according to some embodiments, the look-up-table may be configured to map the location identifier to a plurality of sets of phase modulation parameters. For example, a phase modulation parameter may be retrieved for each microphone within a microphone array. Such phase parameters included in the look-up-table may have been determined by an entity, such as a manufacturer, during a design and manufacturing process.

Method 900 may perform operation 906 during which an audio signal may be received at a plurality of microphones and based on the plurality of phase modulation parameters. Accordingly, an audio signal may be generated at the location being observed by, for example, a seated passenger speaking, and the audio signal may be received at the microphones included in the microphone array. The audio signal generated by the microphones may be phase modulated based on the phase modulation parameters to provide beam forming and directionality for listening capabilities of the microphone array.

Figure 10:
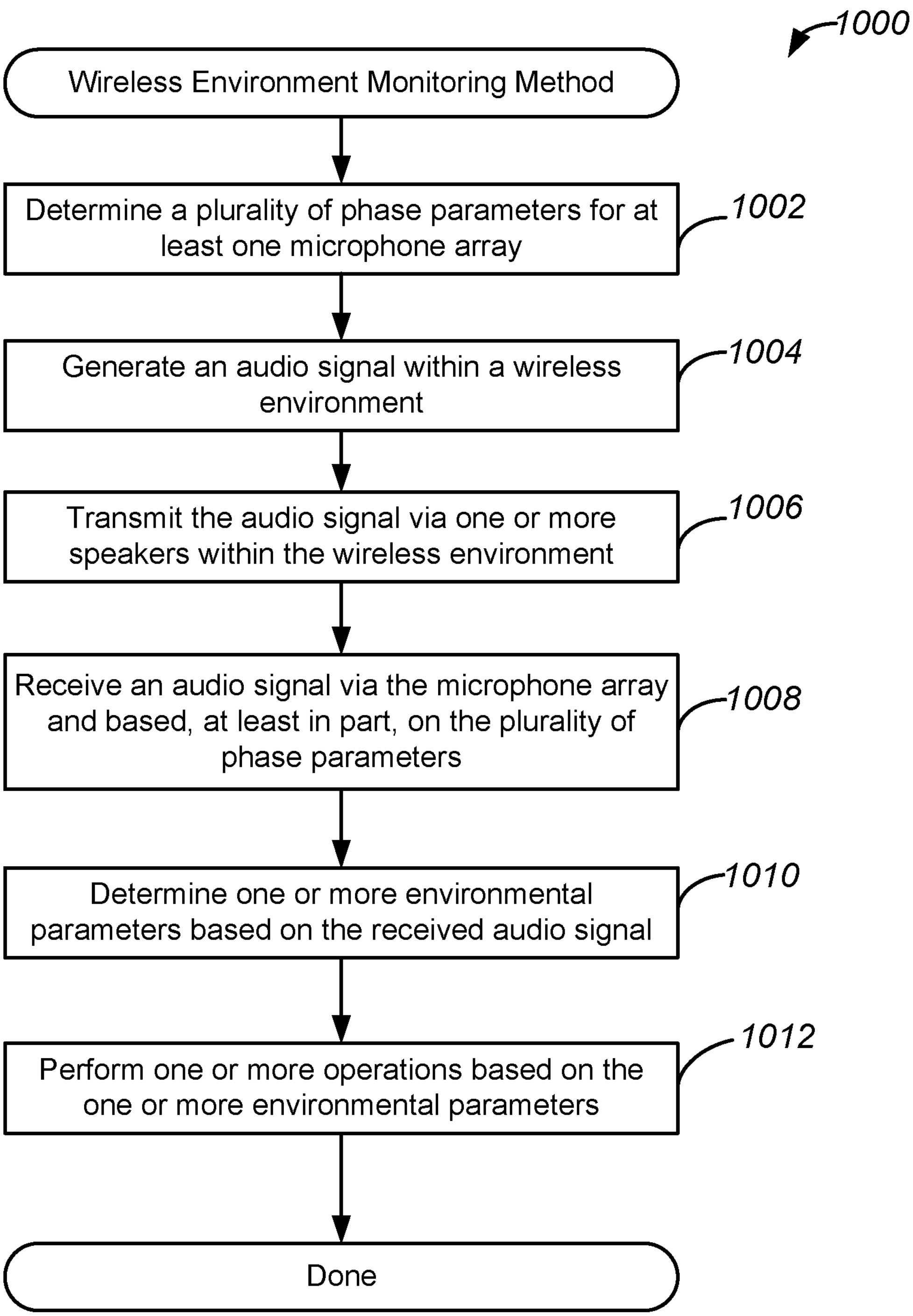
FIG. 10 illustrates diagram of another method for automobile environment monitoring and signal steering, configured in accordance with some embodiments.

FIG. 10 illustrates diagram of another method for automobile environment monitoring and signal steering, configured in accordance with some embodiments. As similarly discussed above, microphones may be configured to directionally receive audio signals from specific locations within an automobile environment. Moreover, a method, such as method 1000, may be performed to directionally receive audio signals that may be used to improve radar operations within an automobile environment.

Method 1000 may perform operation 1002 during which a plurality of phase parameters may be determined for at least one microphone array. As similarly discussed above, such phase parameters may be determined based on a look-up-table configured for the at least one microphone array, and the phase parameters may be determined by an entity, such as a manufacturer, during a design and manufacturing process. It will be appreciated that a microphone array may have a look-up-table configured specifically for that microphone array based on its position relative to locations within the automobile environment, such as seat locations.

Method 1000 may perform operation 1004 during which an audio signal may be generated within an automobile environment. As similarly discussed above, a waveform may be generated for radar operations, and may be generated in accordance with radar operations performed by a radar module. For example, the audio signal may be generated by a 60 GHz Doppler radar module.

Method 1000 may perform operation 1006 during which the audio signal may be transmitted via one or more speakers within the automobile environment. Accordingly, the audio signal may be transmitted via one or more speakers included in the radar module, and may be transmitted to various locations within the automobile environment.

Method 1000 may perform operation 1008 during which an audio signal may be received via the microphone array and based, at least in part, on the plurality of phase parameters. Accordingly, a reflected audio signal may be received at the microphones included in the microphone array. The audio signal generated by the microphones may be phase modulated based on the phase modulation parameters to provide beam forming and directionality for listening capabilities of the microphone array. In this way a signal-to-noise ratio of received audio signals used for radar operations may be improved.

Method 1000 may perform operation 1010 during which one or more environmental parameters may be determined based on the received audio signal. As similarly discussed above, the environmental parameters may be generated based on radar computations, and may identify whether or not an entity is present at the location that was measured. More specifically, the environmental parameters may be configured to represent a positive or negative determination of a presence of an entity based on radar operations, and may be stored in memory.

Method 1000 may perform operation 1012 during which one or more operations may be performed based on the one or more environmental parameters. As similarly discussed above, the operations may be performed responsive to the detection of an entity. For example, in response to detecting an entity, such as a person, at the location being measured, a message may be generated and transmitted wirelessly to a wireless device, such as a smart phone. Accordingly, in response to detecting a person, operations such as generation of a notification message, lowering of automobile windows, and/or unlocking of doors may be performed.

Figure 11:
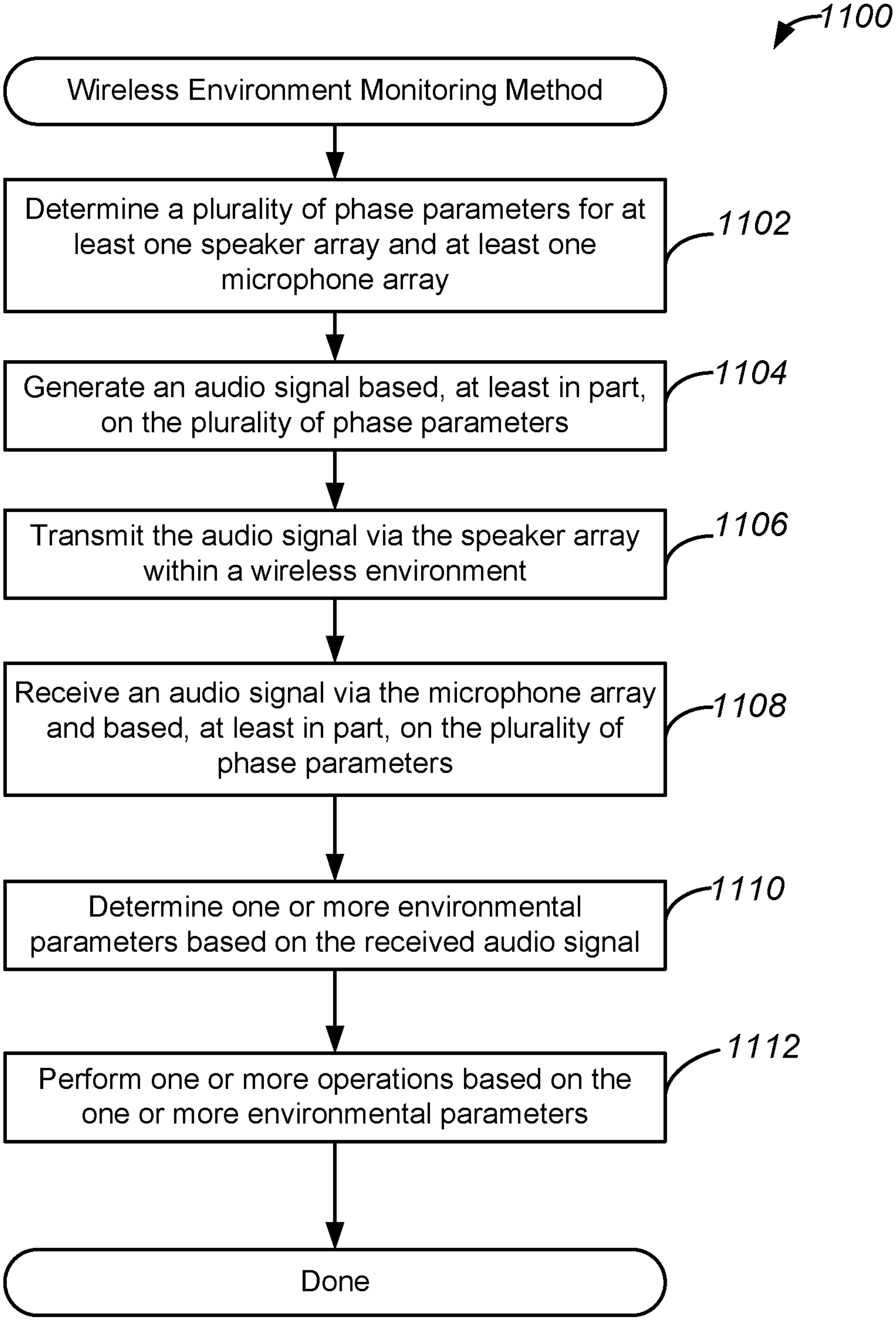
FIG. 11 illustrates diagram of a method for automobile environment monitoring and signal steering, configured in accordance with some embodiments.

FIG. 11 illustrates diagram of a method for automobile environment monitoring and signal steering, configured in accordance with some embodiments. As similarly discussed above, speakers may be configured to generate directional audio signals configured to target specific locations within an automobile environment. Moreover, microphones may be configured to directionally receive audio signals from locations. Accordingly, a method, such as method 1100, may be performed to generate directional audio signals and directionally receive reflected audio signals used to improve radar operations within an automobile environment. In this way, beam forming and directionality provided by techniques disclosed herein may be leverage for both transmission and reception operations in radar determinations.

Method 1100 may perform operation 1102 during which a plurality of phase parameters may be determined for at least one speaker array and at least one microphone array. As similarly discussed above, such phase parameters may be determined based on a look-up-table configured for the at least one speaker array and the at least one microphone array, and the phase parameters may be determined by an entity, such as a manufacturer, during a design and manufacturing process. As also discussed above, an automobile environment may include multiple speaker arrays, such as four speaker arrays, and each speaker array may have a look-up-table configured specifically for that speaker array based on its position relative to locations within the automobile environment, such as seat locations.

Accordingly, during operation 1102, a location may be identified, and phase parameters may be looked up based on the initial location that was identified. As similarly discussed above, a set of designated locations may be mapped to appropriate phase parameters within the look-up-table, and the phase parameters may be identified based on the mapping. Accordingly, the location may be provided to look-up-tables for the speaker arrays as well as a look-up-table for the microphone array. As also discussed above, the location may be identified based on an input received from the automobile environment. For example, such an input may be received from a sensor, such as a seatbelt sensor or a pressure sensor, included at a particular location, such as a seat location. In another example, the location may be identified based on a progression through a designated set of locations.

Method 1100 may perform operation 1104 during which an audio signal may be generated based, at least in part, on the plurality of phase parameters. As similarly discussed above, a waveform may be generated for radar operations, and may be modulated based on the phase parameters. For example, each speaker within the speaker array may have its own audio signal configured based on a phase parameter specific to that speaker. More specifically, the phase parameter may identify a phase shift or phase delay, and the audio signal for each speaker within the speaker array may be modified to implement the phase parameter for that speaker as determined based on the look-up-table.

Method 1100 may perform operation 1106 during which the audio signal may be transmitted via the speaker array within an automobile environment. Accordingly, the audio signal may be amplified and output via the speakers included in the speaker array. As discussed above, the phase parameters applied to the audio signals may provide beam forming and directionality of the audio output that targets a designated location that corresponds to the initially identified location mentioned above with reference to operation 1102.

Method 1100 may perform operation 1108 during which an audio signal may be received via the microphone array and based, at least in part, on the plurality of phase parameters. Accordingly, a reflected audio signal may be received at the microphones included in the microphone array. The audio signals generated by the microphones may be phase modulated based on the phase modulation parameters to provide beam forming and directionality for listening capabilities of the microphone array. In this way a signal-to-noise ratio of received audio signals used for radar operations may be improved.

Method 1100 may perform operation 1110 during which one or more environmental parameters may be determined based on the received audio signal. As similarly discussed above, the environmental parameters may be generated based on radar computations, and may identify whether or not an entity is present at the location that was measured. More specifically, the environmental parameters may be configured to represent a positive or negative determination of a presence of an entity based on radar operations, and may be stored in memory.

Method 1100 may perform operation 1112 during which one or more operations may be performed. based on the one or more environmental parameters. As similarly discussed above, the operations may be performed responsive to the detection of an entity. For example, in response to detecting an entity, such as a person, at the location being measured, a message may be generated and transmitted wirelessly to a wireless device, such as a smart phone. Accordingly, in response to detecting a person, operations such as generation of a notification message, lowering of automobile windows, and/or unlocking of doors may be performed.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:

determining, using a processing device, a designated target location and a type of audio information;

determining, using the processing device, a first plurality of phase modulation parameters for at least one speaker array of a plurality of speaker arrays based on the type of audio information and a relationship between speakers included in the plurality of speaker arrays and the designated target location, wherein each of the plurality of speaker arrays is positioned at a different location within an automobile;

generating, using the processing device, a plurality of audio signals for the speakers included in the plurality of speaker arrays, each of the plurality of audio signals including a phase adjustment determined based on the first plurality of phase modulation parameters; and transmitting the plurality of audio signals via the plurality of speaker arrays to the designated target location, wherein an audio output is generated at the designated target location based on a collective output from the plurality of speaker arrays at the designated target location.

2. The method of claim 1, wherein the designated target location is identified based on one or more radar computations.

3. The method of claim 1, wherein the first plurality of phase modulation parameters is determined based on a look-up-table.

4. The method of claim 3, wherein the look-up-table provides a mapping between a plurality of designated target locations and a phase modulation parameter for each speaker for each of the plurality of designated target locations.

5. The method of claim 4, wherein the plurality of phase modulation parameters identify a phase offset value for each speaker included in the speaker array.

6. The method of claim 1 further comprising:

determining, using the processing device, a second plurality of phase modulation parameters for a microphone array based on a relationship between microphones included in the microphone array and the designated target location; and receiving an audio signal via the microphone array from the designated target location.

7. The method of claim 6 further comprising:

determining if an entity is present at the designated target location based, at least in part, on the received audio signal.

8. The method of claim 7, wherein the determining if the entity is present comprises:

determining a temporal offset value associated with the received audio signal; and determining if an entity is present based on a comparison of the temporal offset value and a designated threshold value.

9. The method of claim 1, wherein the speaker array is included in a cabin of the automobile.

10. A system comprising:

a speaker array comprising a plurality of speakers, the speaker array being included in a plurality of speaker arrays, wherein each of the plurality of speaker arrays is positioned at a different location within an automobile; and a processing device comprising one or more processors configured to:

determine a designated target location and a type of audio information;

determine a first plurality of phase modulation parameters for at least one speaker array of the plurality of speaker arrays based on the type of audio information and a relationship between the plurality of speakers and the designated target location;

generate a plurality of audio signals for the speakers included in the plurality of speaker arrays, each of the plurality of audio signals including a phase adjustment determined based on the first plurality of phase modulation parameters; and transmit the plurality of audio signals via the plurality of speaker arrays to the designated target location, wherein an audio output is generated at the designated target location based on a collective output from the plurality of speaker arrays at the designated target location.

11. The system of claim 10, wherein the designated target location is identified based on one or more radar computations.

12. The system of claim 10, wherein the first plurality of phase modulation parameters is determined based on a look-up-table.

13. The system of claim 12, wherein the look-up-table provides a mapping between a plurality of designated target locations and a phase modulation parameter for each speaker for each of the plurality of designated target locations, and wherein the plurality of phase modulation parameters identify a phase offset value for each speaker included in the speaker array.

14. The system of claim 10, wherein the processing device is further configured to:

determine a second plurality of phase modulation parameters for a microphone array based on a relationship between microphones included in the microphone array and the designated target location; and receive an audio signal via the microphone array from the designated target location.

15. The system of claim 14, wherein the processing device is further configured to:

determine if an entity is present at the designated target location based, at least in part, on the received audio signal.

16. A device comprising:

one or more processors configured to:

determine a designated target location and a type of audio information;

determine a first plurality of phase modulation parameters for at least one speaker array of a plurality of speaker arrays based on the type of audio information and a relationship between a plurality of speakers and the designated target location, wherein each of the plurality of speaker arrays is positioned at a different location within an automobile;

generate a plurality of audio signals for the speakers included in the plurality of speaker arrays, each of the plurality of audio signals including a phase adjustment determined based on the first plurality of phase modulation parameters; and transmit the plurality of audio signals via the plurality of speaker arrays to the designated target location, wherein an audio output is generated at the designated target location based on a collective output from the plurality of speaker arrays at the designated target location.

17. The device of claim 16, wherein the first plurality of phase modulation parameters is determined based on a look-up-table.

18. The device of claim 17, wherein the look-up-table provides a mapping between a plurality of designated target locations and a phase modulation parameter for each speaker for each of the plurality of designated target locations, and wherein the plurality of phase modulation parameters identify a phase offset value for each speaker included in the speaker array.

19. The device of claim 16, wherein the one or more processors are further configured to:

determine a second plurality of phase modulation parameters for a microphone array based on a relationship between microphones included in the microphone array and the designated target location; and receive an audio signal via the microphone array from the designated target location.

20. The device of claim 19, wherein the one or more processors are further configured to:

determine if an entity is present at the designated target location based, at least in part, on the received audio signal.

* * * * *